Nov. 21, 1933.  F. S. KINGSTON  1,935,800
ELECTRIC MOTOR
Filed July 25, 1929
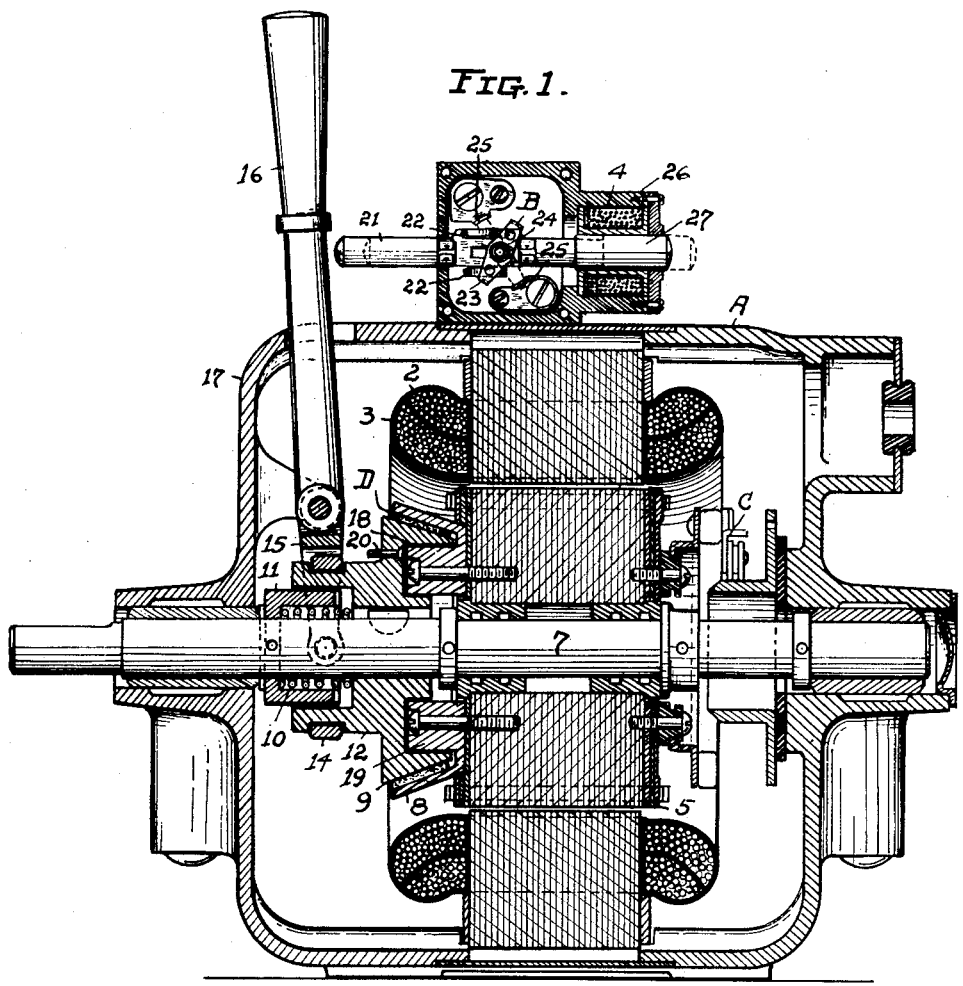
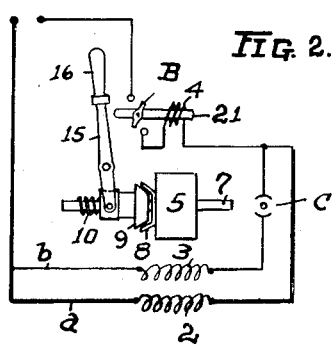
INVENTOR
F. S. KINGSTON.
BY
Fisher, Moser & Moore
ATTORNEY Patented Nov. 21, 1933

1,935,800

UNITED STATES PATENT OFFICE 1,935,800

ELECTRIC MOTOR

Frederick S. Kingston, Warren, Ohio, assignor, by mesne assignments, to Sunlight Electrical Company, a corporation of Ohio Application July 25, 1929. Serial No. 380,875

9 Claims. (Cl. 172—279)

My invention relates to an improvement in electric motors, and the improvement is of especial utility in a motor having a rotor member in releasable clutch connection with the power transmitting shaft. Thus my object is to provide an electric motor having a high starting efficiency, that is, a high torque with low starting current, using a manually-operable clutch co-operatively with electric switching means, whereby the motor may be started with the shaft unclutched and free from the load. A further object is to provide means for stopping the motor automatically when it is stalled or overloaded. Also, the clutch operating means and the switching devices are particularly arranged and related for joint and independent action, whereby the switch may be operated to switch on the starting current automatically when the clutch is released manually, whereby the clutch may be released manually while the motor is running, without operating the switch to cut off the electric current; and whereby the switch and clutch operating means may be restored to their original co-operating position when the current is switched off to manually or automatically stop the motor.

In the accompanying drawing, Fig. 1 is a sectional view of an electric motor embodying my improvement, and Fig. 2 a schematic diagram of an electric circuit therefor. The motor A delineated in these views represents one embodiment of the invention, the motor itself being of the single-phase squirrel cage type having a main winding 2 and a starting winding 3 connected across the line, substantially as indicated in Fig. 2 by the parallel circuits $a$ and $b$, respectively. Main circuit $a$ includes a switch B and an overload coil or winding 4, and the starting or secondary circuit $b$ includes a centrifugal switch C for cutting out the starting coil 3 when the rotor revolves at high speed. A reactance or condenser may also be included to effect time phase displacement of the current according to common practice in single or split phase motors.

The rotor or driving member 5 is free to revolve on the motor shaft 7 or driven member, except that these two members are held normally in driving connection by a friction clutch D, of any suitable kind. As shown this clutch is of the cone type comprising a dished member 8 secured to one end of rotor 5, and a friction cone 9 splined slidably on shaft 7. Engagement is effected by a spring 10 interposed between cone 9 and a collar 11 secured to shaft 7. Disengagement of the clutch members is effected manually, the friction cone 9 having a grooved hub 12 carrying a collar or ring 14 which is pivotally or loosely engaged by a forked lever 15 having a handle 16 projecting outside of the motor casing 17 where the operator may conveniently grasp and manipulate the same. As shown, lever 15 is pivotally supported within the casing, but may be mounted and constructed in other ways than as shown. Thus, in lieu of using a handle 16 adapted to be gripped by hand, clutch lever 15 may be connected to a treadle and controlled by the operator's foot to throw out or disengage the clutch members. In either case the coiled spring throws in the clutch and holds the rotor in driving connection with the shaft when not opposed manually or otherwise. That is to say, the operator may hold the clutch open for a short or long interval against the action of the spring, or the closing movement of the clutch may be temporarily retarded or restrained by other means. For example, a dash pot type of clutch may be used as delineated in Fig. 1, wherein an annular plunger or piston 19 is formed on or carried by or within the dished member 8 to rotate and slide with a close fit within the air pocket or chamber 18. A check valve 20 in an air inlet passage leading to the air chambers permits free intake of air so that the clutch members may be easily separated, but this valve will close and prevent the free escape of air during the closing movement of the clutch members, thereby restraining or retarding their clutching action. Thus the operator may release the clutch members instantly, and should he relieve or remove his hold on the lever the clutch members will not grab or lock together immediately but allow a short interval of time to elapse in which the rotor may speed up or reach synchronous speed without load.

Starting of the motor by the passage of electric current therethrough is effected co-incidently with the throwout movement of the clutch. Thus, an electric switch B is mounted opposite clutch lever 15 where it will be actuated and thrown in by the throw-out or unclutching movement of the lever. The switch shown in Fig. 1, is merely representative of one type of snap switch which may be employed for that purpose, and it comprises a reciprocable push member 21 having its opposite ends extending through the opposite ends of the switch body. Member 21 is slotted and embodies cams 22 adapted to co-act with an oscillatory contact arm 23 which is operated by a coiled spring 24 to snap into and out of engagement with a pair of contact terminals 25 when the push member is shifted alternately in opposite directions. This form of switch is old and well known, and a more detailed showing therefore is unnecessary, nor do I wish to limit myself to this specific form of snap switch. Suffice to say that when the clutch lever 15 is shifted to throw out the motor clutch, a snap switch is operated to switch on the current to start the motor. The switch remains in the closed position to which it has been shifted, whereas the clutch lever will be returned to its original position and the clutch D thrown in by spring 10 whenever the operator removes or relieves his grip on handle 16. He may delay the clutching action himself, or should he release his hold on the handle the closing of the clutch will be retarded for a brief interval by check valve 20. In that interval while the rotor is disconnected or unclutched from the motor shaft both the main and starting windings of the motor are energized and the rotor will speed up quickly to high speed on a low current. When the rotor reaches a predetermined number of revolutions per minute the centrifugal switch C cuts out the starting winding, preferably before maximum speed is attained. The motor runs then only on the main or running winding and develops a high torque with a small amount of current, whereupon the clutch is thrown in to connect the speeding rotor with the shaft and load. Thereafter, and while the motor is running, lever 15 may be manipulated to release and engage the clutch without opening the switch. The lever, however, is held normally in a retired position or apart from the switch operating member 21 when the motor is running, see the dotted position of the push member 21 in Fig. 1. Consequently, this switch member 21 may be returned to its original position at any time by hand to switch off the current and stop the motor.

Provision is also made to open the switch automatically when the motor stalls or is overloaded and draws additional current from the line. Thus, an overload coil or electro-magnet 4 is mounted within an extension 26 on the switch body, and a short section 27 of the operating member 21 for the switch is made of permeable iron and functions as a movable core within the coil, so that the switch may be operated automatically, as well as manually, to stop the motor. Thus should the motor stall or be overloaded, the overload coil 4 will be energized in the degree required to break the main circuit for the motor, thereby preventing harm or damage to the windings.

What I claim, is:

1. An electric motor including a rotor and a shaft supporting the rotor, a clutch normally connecting said rotor and shaft, a manually operable device for releasing the clutch, and a snap switch-device operated by release movements of the clutch for switching on the starting current upon release of the clutch and an overload release for automatically opening said switch when the motor is overloaded.

2. An electric motor including a rotor and a shaft carrying the rotor, a normally engaged clutch, for connecting the rotor and shaft, a manually operable device for throwing out said clutch, and an electric snap switch connected operatively with said clutch throw-out device for actuation in one direction by said device, whereby the current will be switched on to start the motor when the clutch is thrown out and the switch remains closed when the clutch is restored to its normal working position.

3. An electric motor having a housing, a shaft extending centrally through the housing, a rotor rotatably mounted on the shaft within the housing, a clutch within the housing for connecting the rotor and shaft, a switch casing mounted on the top of the housing, a snap switch in the switch housing controlling the supply of current to the motor and having a slidable actuating rod for closing and opening the switch which extends through the housing and is adapted to project on either side thereof, and means for manually actuating the clutch including a lever pivoted within the housing and extending through the top thereof, said lever being engageable with one of the projecting ends of said rod to actuate the same in one direction.

4. An electric motor having a housing, a shaft extending centrally through the housing, a rotor rotatably mounted on the shaft within the housing, a clutch within the housing for connecting the rotor and shaft, spring actuated means for normally holding the clutch in closed position, means for releasing the clutch including a hand lever pivoted within the housing and extending through a wall thereof, a snap switch for controlling the supply of current to the motor having an actuating part in the path of the lever which projects into the path of the lever when the switch is open whereby the switch is closed upon actuation of the lever to release the clutch.

5. An electric motor including a shaft, a rotor on the shaft, a clutch for connecting the rotor to the shaft, a switch for starting and stopping the motor, manually operable means for simultaneously releasing the clutch and closing the switch to start the motor, means for returning the clutch to engaging position upon release of said manually operable means, and means controlled independently of the clutch for releasably holding the switch closed after the clutch is reengaged.

6. An electric motor including a shaft, a rotor on the shaft, a normally engaged clutch for connecting the rotor and shaft, a manually operable clutch shifted for releasing the clutch, a normally open switch for starting and stopping the motor, said switch having a movable element in the path of a part of said shifter, whereby the switch is closed upon release of the clutch, and manually operable means for releasably retaining the switch in closed position.

7. An electric motor including starting and running circuits, a shaft, a rotor on said shaft, a clutch for connecting the rotor to the shaft, a main switch for controlling said circuits, manually operable means for simultaneously releasing the clutch and closing said switch to start the motor, means for returning said clutch to engaging position upon release of said manually operable means, means independent of said manually operable means for retaining said switch in closed position, and means responsive to the speed of the motor for controlling the flow of current through said starting circuit.

8. An electric motor including starting and running circuits, a shaft, a rotor on said shaft, a clutch for connecting the rotor to the shaft, a main switch for controlling said circuits, manually operable means for simultaneously releasing the clutch and closing said switch to start the motor, means for automatically returning said clutch to engaging position upon release of said manually operable means, means for retarding the return movement of said clutch, means independent of said manually operable means for retaining said switch in closed position, and means responsive to the speed of the motor for controlling the flow of current through said starting circuit.

9. An electric motor including starting and running circuits, a shaft, a rotor on said shaft, a clutch for connecting the rotor to the shaft, a main switch for controlling said circuits, manually operable means for simultaneously releasing the clutch and closing said switch to start the motor, means for returning said clutch to engaging position upon release of said manually operable means, means independent of said manually operable means for retaining said switch in closed position, means responsive to the speed of the motor for controlling the flow of current through said starting circuit, and means for automatically opening said main switch when the motor is overloaded.

FREDERICK S. KINGSTON.